United States Patent [19]
Koch et al.

[11] 3,884,962
[45] May 20, 1975

[54] PHENYLCARBAMATES

[75] Inventors: Richard C. Koch, Niantic, Conn.;
Hugh C. Richards, Canterbury, England

[73] Assignee: Pfizer Inc., New York, N.Y.

[22] Filed: June 21, 1973

[21] Appl. No.: 372,023

[30]    Foreign Application Priority Data
   June 29, 1972   United Kingdom............... 30396/72

[52] U.S. Cl...... 260/479 C; 260/465 D; 260/607 A;
                       260/609 E; 260/620; 424/300
[51] Int. Cl. ......................................... C07c 125/06
[58] Field of Search ................................ 260/479 C

[56]         References Cited
         UNITED STATES PATENTS
2,485,550   10/1949   Aeschlimann et al. ............. 260/479
3,632,631   1/1972    Wright................................ 260/479

*Primary Examiner*—James A. Patten
*Attorney, Agent, or Firm*—Connolly and Hutz

[57]             ABSTRACT

Arylthio-, arylsulphinyl- and arylsulphonyl-substituted aryl N-alkyl carbamates and thiocarbamates wherein the aryl moieties represent naphthyl-, phenyl and substituted phenyl groups, and their use as pesticides are described.

10 Claims, No Drawings

PHENYLCARBAMATES

BACKGROUND OF THE INVENTION

1. Field of the Invention

The invention relates to a series of phenylthio-, phenylsulphinyl- and phenylsulphonyl-substituted phenyl N-alkyl carbamates and thiocarbamates with useful pesticidal properties. The compounds are particularly effective in destroying the adults and/or larvae of insects and other pests which tend to infest the skins of animals, especially those of sheep and cattle, and are therefore especially useful as ectoparasiticidal agents for treating such animals. They may also be useful as insecticides for other applications.

2. Description of the Prior Art

A number of esters of carbamic acid in which the ester moiety is relatively simple in structure are useful pesticides, e.g., o-isopropoxy-phenyl-N-methylcarbamate; 4-dimethylaminophenyl-3,5-xylyl-N-methylcarbamate, 1-naphthyl-N-methylcarbamate; m-(1-ethylpropyl)phenyl-N-methylcarbamate and m-(1-methylbutyl)phenyl-N-methylcarbamate.

Belgian Pat. No. 659,636, granted Aug. 12, 1965, reports on the use of 2-(4-chlorophenoxy)-4,5-dichlorophenyl-N-methylcarbamate and 2-(4-chlorophenoxy)-4-chlorophenyl-N-methylcarbamate as bacteriostats and inhibitors of pathogenic mycetes. Farmacia XVII, 721-5 (1969) describes a series of 4-phenylsulphonylphenol N-(substituted)carbamates wherein the substituent is methyl, ethyl, propyl, butyl, allyl and cyclohexyl. None of the products is stated to have ectoparasiticidal properties. N-acyl derivatives of arylcarbamates are described in U.K. Pat. No. 982,235 as insecticides of reduced mammalian toxicity.

As a result of the breeding of adult insects and other pests on animal skins, the larvae produced tend to burrow into the skins of the afflicted animals and thereby spoil the state of the skins, with the consequence, for example, that cattle hides and sheep skins and fleece intended for the manufacture of leather, sheepskin and woollen goods, respectively, are reduced in quality. Furthermore, the state of health and the quality of the flesh of the afflicted animals may be detrimentally affected. Certain insect larvae, for example, the larvae of blowflies which tend to live in sheep skin are capable of bringing premature death to the animal if present in sufficient abundance. Tick larvae, which tend to live in cattle hides, facilitate the transmission of diseases to the afflicted animals to a marked degree.

It is therefore an object of the invention to provide a series of compounds having useful pesticidal properties, in particular, against insects and other pests, such as blowflies, ticks and mites, which are the cause of ectoparasitic infections of animals, as well as against household or crop insect pests, e.g., houseflies.

SUMMARY OF THE INVENTION

The compounds of the present invention are substituted phenyl N-alkylcarbamates and thiocarbamates having the general formula

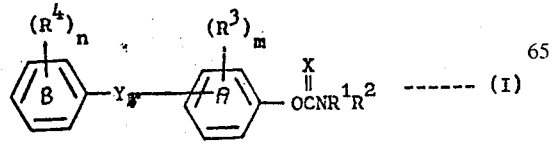

where
  $R^1$ represents a lower alkyl group;
  $R^2$ represents a hydrogen atom, or a lower alkyl or an acyl group, as hereinafter defined;
  $R^3$ and $R^4$ each represent a halogen atom or a lower alkyl, lower alkoxy, lower alkylthio, trifluoromethyl, nitro, cyano, mono- or di- lower alkylamino, or aryl group; either of the benzene rings A and B may be replaced by a naphthalene ring;
  $m$ is 0 to 4 when ring A is a benzene ring and 0 to 6 when ring A is a naphthalene ring;
  $n$ is 0 to 5 when ring B is a benzene ring and 0 to 7 when ring B is a naphthalene ring, and when either $m$ or $n$ is more than 1, the groups $R^3$ and $R^4$, respectively, may represent the same or different atoms or groups;
  X represents an oxygen or a sulphur atom;
and
  Y represents a sulphur (thio) atom, or a sulphinyl or sulphonyl group, with the proviso that Y is not a sulphonyl group in the 4- position of a benzene ring A, relative to the group $-OCXNR^1R^2$, when $m$ and $n$ are both 0, X is an oxygen atom and $R^2$ is a hydrogen atom.

DETAILED DESCRIPTION OF THE INVENTION

In this specification the term 'halogen' means fluorine, chlorine, bromine or iodine, and 'lower' when qualifying an alkyl, alkoxy or alkylthio group means that such a group contains from one to six carbon atoms. Alkyl groups containing three or more carbon atoms may be straight or branched chain alkyl groups.

The term 'acyl group' is herein defined as a group $-COR^5$, wherein $R^5$ represents hydrogen or a lower alkyl, lower alkoxy-lower alkyl, lower alkylthio-lower alkyl, halo-lower alkyl, phenyl-lower alkyl, phenoxy-lower alkyl phenylthio-lower alkyl or phenyl group, any benzene ring therein being optionally substituted with one or more of those groups specified in the definitions of $R^3$ and $R^4$.

The compounds of the invention may be prepared in a number of ways:

1. Compounds of the formula (I) in which Y represents a sulphur atom and $R^2$ represents a hydrogen atom may be prepared by reacting the appropriate phenylthio-phenol, of the formula:

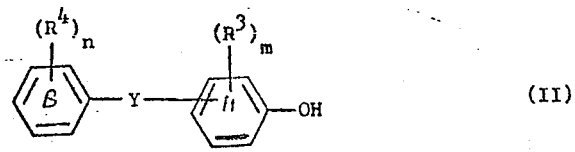

with a lower alkyl isocyanate $R^1NCO$ or isothiocyanate $R^1NCS$, suitably in solution in a reaction inert organic solvent, e.g. toluene, and in the presence of a base, e.g. triethylamine, under reflux conditions. The product is suitably recovered by removal of any undissolved solid from the cooled reaction solution by filtration and thereafter evaporating the solution in vacuo to dryness. Purification of the crude product may then be effected by recrystallisation from a suitable solvent, e.g. a mixture of benzene and petroleum ether. Substituted phenylthio-phenol starting materials, which are not already known compounds, may be prepared by methods analogous to those described in the literature.

2. Compounds of the formula (I) in which Y represents a sulphinyl or a sulphonyl group may be prepared by oxidation of compounds of the formula (I) in which Y represents a sulphur atom. Alternatively, the intermediate p-phenylthio-phenols may be oxidised to the corresponding sulphinyl or sulphonyl compounds, such products then being converted to the required final products by method (1) or by methods (3) or (4) following.

The preparation of the sulphinyl compounds can usually be effected by controlled oxidation of the corresponding sulphide with such reagents as nitric acid, hydrogen peroxide, potassium permanganate or a peracid. For example, the sulphide may be mixed with a molar proportion of hydrogen peroxide in 30% aqueous solution and sufficient acetic acid to give a homogeneous solution, and the reaction solution left to stand at room temperature over a period of several days. Isolation of the product may then be effected by pouring the reaction solution into water, extraction into chloroform, and evaporation of the previously washed and dried chloroform solution, the residue then being purified by conventional techniques.

The sulphonyl compounds are generally prepared from the corresponding sulphides under stronger oxidative conditions. A particular sulphonyl compound, for example, may be produced by mixing the corresponding sulphide with a 2½ molar proportion of 30% aqueous hydrogen peroxide solution in acetic acid solution. The product may crystallise from the reaction solution after a period of standing at room temperature, or by cooling strongly, and it may then be collected by filtration and purified by conventional techniques.

3. Compounds of the formula (I) in which $R^2$ represents a lower alkyl group may be prepared from an alkali metal derivative of an appropriately substituted phenylthio-phenol of the formula (II), or of a corresponding sulphinyl or sulphonyl compound, by reaction with an N-disubstituted carbamoyl or thiocarbamoyl chloride, of the formula $R^1R^2NCXCl$.

The alkali metal derivative is suitably prepared from the phenol by addition of an alkali metal compound, e.g. sodium hydride, to a solution of the phenol in a dry reaction inert organic solvent, e.g. dry benzene.

The reaction with the substituted carbamoyl or thiocarbamoyl chloride is suitably performed by adding the latter to the reaction mixture of alkali metal compound and phenol derivative in the solution after formation of the alkali metal derivative, and then refluxing the mixture for several hours. Isolation of the product may be effected by adding the cooled reaction mixture to water, separating the organic layer and washing, drying and evaporating it in vacuo to dryness, and purification may then be performed by conventional techniques.

4. Compounds of the formula (I) in which $R^2$ represents an acyl group as hereinbefore defined may be prepared from the corresponding compounds in which $R^2$ represents a hydrogen atom by conventional acylation techniques using such acylating agents as the appropriate acyl halide or carboxylic acid anhydride. In some cases where the acyl halide is used as the acylating agent, it is advantageous to form the sodio derivative of the starting material e.g. by addition of sodamide to a solution of the compound in a dry reaction inert organic solvent, e.g. dry toluene, before reacting with the acyl halide.

Also according to the invention, a method of combatting ectoparasite infections of animals comprises administering externally to an infected animal a compound of the formula (I) in which $R^1$, $R^2$, $R^3$, $R^4$, $m$, $n$ and X are as hereinbefore defined and Y represents a sulphur atom, or a sulphinyl or sulphonyl group, without further proviso.

The invention is illustrated by the following Examples, in which all temperatures are given in °C.

EXAMPLE I

A. To a stirred solution of 3,5-dimethylphenol (3.66g) in anhydrous tetrahydrofuran (100ml) containing aluminium chloride (0.05g) was slowly added over one-half hour a solution of 4-bromobenzenesulphenyl chloride (7.9g, 93% pure material) in anhydrous tetrahydrofuran (40ml), maintaining the temperature of the reaction mixture between 30° and 40° throughout the addition. The mixture was then heated under reflux for 1½ hours, after which the solvent was removed by evaporation in vacuo and the resulting solid residue was crystallised from a mixture of benzene and petroleum ether (b.p. 60° – 80°) to afford 1.9g of 4-(4-bromophenylthio)-3,5-dimethylphenol, m.p. 99° – 101°.

A second batch was prepared similarly.
Analysis:

Found: C, 54.37; H, 4.12%
Required for $C_{12}H_{13}BrOS$: C, 54.37; H, 4.27%

B. The product of (A) (2.9g) and methyl isocyanate (0.6g) were dissolved in dry toluene (150ml) containing triethylamine (0.05g) and the solution was refluxed for 4 hours. After addition of a further quantity of methyl isocyanate (0.3g), the solution was refluxed for a further 2 hours and then allowed to stand at room temperature overnight. The solvent was removed by evaporation in vacuo and the resulting residue was crystallised from a mixture of benzene and petroleum ether (b.p. 60° – 80°) to yield 1.8g of 4-(4-bromophenylthio)-3,5-dimethylphenyl N-methylcarbamate, m.p. 122.5° – 123.5°.
Analysis:

Found: C, 52.67; H, 4.41; N, 4.13%
Required for $C_{16}H_{16}BrNO_2S$: C, 52.46; H, 4.40; N, 3.82%

EXAMPLES II TO XIX

The following compounds were prepared by procedures similar to that described in Example I, using appropriately substituted benzenesulphenyl chloride and phenol as starting materials in the first stage and either methyl or ethyl isocyanate as a reagent in the second stage.

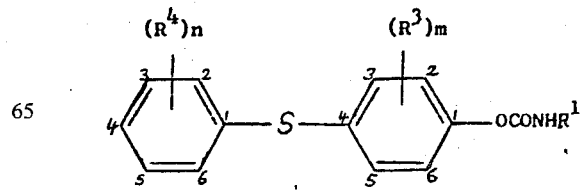

—Continued

| Example | (R⁴)n | (R³)m | R¹ | M.p.°C | Analysis (Theoretical in brackets) | | |
|---------|-------|-------|-----|--------|------|------|------|
| | | | | | C% | H% | N% |
| II | 4—Cl. | 3,5—di—CH₃ | —C₂H₅ | 123–5° | 60.68 | 5.33 | 4.25 |
| | | | | | (60.80 | 5.36 | 4.17) |
| III | 4—Cl | 2,3,5—tri—CH₃ | —CH₃ | 145–7° | 61.16 | 5.42 | 3.72 |
| | | | | | (60.80 | 5.37 | 4.15) |
| IV | 4—Cl | H | —CH₃ | 112–4° | 56.54 | 4.15 | 4.80 |
| | | | | | (56.47 | 4.37 | 4.70) |
| | | | | | (calculated for C₁₄H₁₂ClNO₂S.¼H₂O) | | |
| V | 4—NO₂ | 3,5—di—CH₃ | —CH₃ | 153–4.5° | 57.76 | 4.93 | 8.73 |
| | | | | | (57.81 | 4.85 | 8.40) |
| VI | 4—Br | 3,6—di—CH₃ | —CH₃ | 122.5–3.5° | 52.40 | 4.79 | 3.57 |
| | | | | | (52.46 | 4.40 | 3.82) |
| VII | 4—CH₃ | 3,5—di—CH₃ | —CH₃ | 109–111° | 67.55 | 6.55 | 4.53 |
| | | | | | (67.80 | 6.31 | 4.65) |
| VIII | 4—C(CH₃)₃ | 3,6—di—CH₃ | —CH₃ | 40–2° | 69.35 | 7.39 | 4.49 |
| | | | | | (69.93 | 7.34 | 4.08) |
| IX | 4—F | 3,5—di—CH₃ | —CH₃ | 103–5° | 62.57 | 5.26 | 4.92 |
| | | | | | (63.00 | 5.25 | 4.59) |
| X | 3—CH₃ | 3,5—di—CH₃ | —CH₃ | 100–1° | 67.47 | 6.36 | 4.51 |
| | | | | | (67.80 | 6.31 | 4.65) |
| XI | 3,4—di—Cl | 3,5—di—CH₃ | —CH₃ | 120.5–1.5° | 53.92 | 4.16 | 3.59 |
| | | | | | (53.94 | 4.24 | 3.93) |
| XII | 2—Cl | 3,5—di—CH₃ | —CH₃ | 122–3° | 59.59 | 5.04 | 4.75 |
| | | | | | (59.71 | 5.01 | 4.35) |
| XIII | 2—Br | 3,5—di—CH₃ | —CH₃ | 149–150° | 52.46 | 4.35 | 3.51 |
| | | | | | (52.46 | 4.40 | 3.82) |
| XIV | 2—CF₃ | 3,5—di—CH₃ | —CH₃ | 109.5–111° | 57.66 | 4.60 | 3.76 |
| | | | | | (57.45 | 4.54 | 3.94) |
| XV | 4—OCH₃ | 3,5— di—CH₃ | —CH₃ | 95–7° (¼—H₂O) | 63.65 | 6.08 | 4.50 |
| | | | | | (63.50 | 6.06 | 4.36) |
| XVI | 4—Cl | 3—CH₃—5—nC₃H₇ | —CH₃ | 92–2.5° | 69.59 | 5.70 | 4.02 |
| | | | | | (61.80 | 5.72 | 4.01) |
| XVII | H | 3—CH₃—5—nC₃H₇ | —CH₃ | 92.5–3° | 68.27 | 6.72 | 4.50 |
| | | | | | (68.60 | 6.67 | 4.44) |
| XVIII | H | 3,5—di—C₂H₅ | —CH₃ | 115–6° | 68.56 | 6.53 | 4.84 |
| | | | | | (68.55 | 6.71 | 4.44) |
| XIX | 4-Cl | 3,5—di—C₂H₅ | —CH₃ | 79–80.5° | 61.78 | 5.76 | 4.06 |
| | | | | | (61.80 | 5.76 | 4.00) |

EXAMPLE XX

A. To a stirred solution of 3,5-dimethylphenol (412g) in anhydrous tetrahydrofuran (2.06l) containing aluminium chloride (2.25g) was added a solution of 4-chlorobenzenesulphenyl chloride (700g) in anhydrous tetrahydrofuran (700ml) over one hour. The mixture was then heated under reflux for one hour, during which time hydrogen chloride was evolved, and then allowed to cool to 40°.

B. Triethylamine (288g, 395ml) was added over a period of 20 minutes, the temperature of the ultimately basic solution having risen to 65°, and the mixture was cooled to 40° before addition of a solution of methyl isocyanate (400g) in anhydrous tetrahydrofuran (600ml) over a period of 15 minutes. The reaction solution was then slowly heated to reflux temperature, 65°, and maintained at that temperature for one hour. After allowing the solution to cool to 35°, the solid material was filtered off and washed with tetrahydrofuran (2 × 500ml), the combined filtrates then being concentrated by evaporation to a volume of about 2 litres, after which evaporation was continued while cyclohexane (2½l) was added. At a final volume of 1½ litres, n-hexane (2½l) was added, and the solution was stirred for 15 minutes and allowed to stand overnight.

The resulting crystals were collected by filtration and washed with n-hexane (500ml) and light petroleum (b.p. 30°–40°) (2 × 500ml). To a solution of the solid in cyclohexane (12.5l) was added anhydrous magnesium sulphate (650g) and neutral alumina (325g), and the mixture was stirred and boiled for a short time. After filtration, the solids were washed with boiling cyclohexane (2 × 2.5l), then cold cyclohexane (2 × 1l) and finally n-pentane (2 × 1l), and the combined filtrates were evaporated in vacuo to afford a solid residue. The latter was crystallised from a mixture of carbon tetrachloride (6.65l) and light petroleum (b.p 60° – 80°) (17.3l) was washed with the same solvent mixture, to yield 575g of 4-(4-chlorophenylthio)-3,5-dimethylphenyl N-methyl-carbamate, m.p. 118°.

Analysis:

Found: C, 59.68; H, 5.03; N, 4.71; Cl, 11.25%
Required for C₁₆H₁₆ClNO₂S: C, 59.71; H, 5.01; N, 4.35; Cl, 11.02%

EXAMPLE XXI

A. To a stirred solution of 3,5-dimethylphenol (6.1g) in n-hexane (70ml) at 50° was slowly added a solution of benzenesulphenyl chloride (8.2g, 88% pure material) in n-hexane (30ml) over a period of 4 hours. The temperature was then raised to 65° and maintained thereat for 3 hours, after which the reaction mixture was allowed to cool to room temperature and left to stand overnight. The resulting precipitate was collected by filtration and recrystallised from benzene to yield 3.1g of 4-phenylthio-3,5-dimethylphenol, m.p. 103° – 105°.

Analysis:

Found: C, 73.11; H, 6.19%
Required for C₁₄H₁₄OS: C, 73.00; H, 6.09%

B. The filtrate from (A) was concentrated in vacuo to afford a light-brown coloured oil, which was submitted to chromatography through a silica gel column, using benzene as the eluent. The oil (8.0g) produced was distilled under reduced pressure to afford 4.0g of 2-phenylthio-3,5-dimethylphenol, b.p. 134° at 0.6mm of mercury pressure.
Analysis:

Found: C, 73.39; H, 6.28%
Required for $C_{14}H_{14}OS$: C, 73.00; H, 6.09%

C. Continued elution with benzene resulted in the production of a further 0.6g of 4-phenyl-3,5-dimethylphenol.

D. The products of (A) and (B) were separately reacted with methyl isocyanate by procedures similar to that described in example I(B) to afford 3,5-dimethyl-4-phenylthiophenyl N-methyl-carbamate, m.p. 97° – 99° and 3,5-dimethyl-2-phenylthiophenyl N-methyl-carbamate, m.p. 105° – 106°; respectively.
Analysis:

Found for the 4-phenylthio product: C, 66.58; H, 6.05; N, 5.20%
Found for the 2-phenylthio product: C, 66.50; H, 6.10; N, 4.90%
Required for $C_{16}H_{17}NO_2S$: C, 66.90; H, 5.92; N, 4.88%

EXAMPLES XXII and XXIII

The following compounds were prepared by procedures similar to that described in Example XXI, using appropriately substituted benzene sulphenyl chloride and phenol as starting materials in the first stage and methyl isocyanate as a reagent in the second stage.

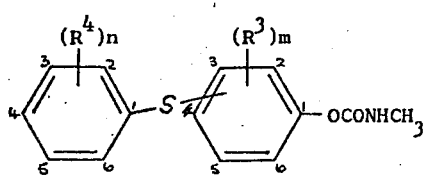

| Example | $(R^4)n$ | $(R^3)m$ | Position of phenyl-thio group | M.p.°C | Analysis (Theoretical in brackets) | | |
|---|---|---|---|---|---|---|---|
| | | | | | C% | H% | N% |
| XXII | 2,3,4,5,6—penta—Cl | 3—$C(CH_3)_3$ | 4— | 187–9° | 44.61 (44.30 | 3.61 3.28 | 3.14 2.87) |
| XIII | 4—Cl | H | 2— | 83–4° | 56.65 (56.47 | 4.03 4.03 | 4.68 4.70) |
| | | | | | (Calculated for $C_{14}H_{12}ClNO_2S.¼H_2O$) | | | evaporation in vacuo, and the residual solid dissolved in benzene. Alumina (1.0g) was added to the benzene solution and the mixture was stirred for 5 minutes, after which the solid was removed by filtration and the filtrate, a pale yellow oil, allowed to stand at room temperature for a week. The resulting crystalline solid was triturated in petroleum ether (30° – 40°), which yielded 0.31g of 3-tert-butyl-4-(4-chlorophenylthio)phenyl N-methyl-carbamate, m.p. 90° – 91°, as white crystals.
Analysis:

Found: C, 61.58; H, 5.83; N, 3.90%
Required for $C_{18}H_{20}ClNO_2S$: C, 61.80; H, 5.72; N, 4.06%

EXAMPLE XXV

To a stirred solution of m-cresol (5.4g) in n-hexane was added dropwise over a period of 3 hours 4-chlorobenzenesulphenyl chloride (10.5g), with gentle warming. After completion of addition, the mixture was maintained within the temperature range 60° – 70° for 15 hours, and then evaporated in vacuo to an oil. The oil was passed through a silica column using benzene as the eluent and 8 fractions were collected. A clean separation into distinct isomers was not achieved, and so the four major fractions were combined and evaporated in vacuo to an oil, yield 6.5g.

The product of the previous stage was reacted with methyl isocyanate by a procedure similar to that described in Example I(B) and the crude product was crystallised from a mixture of benzene and petroleum ether to afford 2.3g of 2-(4-chlorophenylthio)-5-methylphenyl N-methyl-carbamate, m.p. 77° – 78°.
Analysis:

Found: C, 58.28; H, 4.66; N, 4.66%
Required for $C_{15}H_{14}ClNO_2S$: C, 58.53; H, 4.58; N, 4.55%

EXAMPLE XXIV

To a solution of 3-tert-butylphenol (4.5g) in dry methylene chloride was added dropwise 4-chlorobenzenesulphenyl chloride (6.3g, 98% pure material) over a period of 5 minutes. The reaction mixture was then refluxed for 4 hours, cooled, the solvent removed by evaporation in vacuo, and the resultant oil submitted to a reduced pressure distillation, yielding 4.5g of fairly pure product.

To a solution of 3-tert-butyl-4-(4-chlorophenylthio) phenol (4.5g, the product of the previous stage) in benzene (100ml), were added 3 drops of triethylamine followed by methylisocyanate (1.0g). The reaction mixture was refluxed for 3 hours, the solvent removed by

EXAMPLE XXVI

To a stirred solution of 2,6-dimethoxyphenol (3.08g) in a little n-hexane/methylene chloride mixture was added slowly over a period of 3 hours a solution of 2,3,-4,5,6-pentachlorobenzenesulphenyl chloride (7.0g) in n-hexane/methylene chloride. The mixture was then refluxed for 6 hours and left to stand overnight at room temperature, during which time a solid precipitated. The solid was collected by filtration to yield 3.6g of material, which was then recrystallised from a mixture of benzene and petroleum ether to afford brown crystals, m.p. 165°–167°. Evaporation of the mother liquor from the reaction mixture in vacuo yielded 5.2g of solid, which was also crystallised from a mixture of benzene and petroleum ether, to afford white crystals, m.p. 166° – 168°.

Analysis:

Found for 1st fraction (brown crystals): C, 38.35; H, 2.39%
Found for 2nd fraction (white crystals): C, 39.13; H, 2.46%
Required for $C_{14}H_9Cl_5O_3S$: C, 38.69; H, 2.09%

Further analytical investigation established that both fractions consisted of 2,6-dimethoxy-3-(2,3,4,5,6-pentachlorophenylthio) phenol. The two fractions from the previous stage were combined to yield 4.3g of material, which was reacted with methyl isocyanate by a procedure similar to that described in Example I(B), to afford 2,6-dimethoxy-3-(2,3,4,5,6-pentachlorophenylthio)phenyl N-methyl-carbamate, m.p. 191.5° – 192.5°.

Analysis:

Found: C, 39.08; H, 2.51; N, 3.01%
Required for $C_{16}H_{12}Cl_5NO_4S$: C, 39.09; H, 2.46; N, 2.85%

EXAMPLE XXVII

To a stirred mixture of 2-ethoxyphenol (138g) and iron powder (0.03g) in a flask protected from light was slowly added, over 30 minutes, 4-chlorobenzenesulphenyl chloride (17.9g) at room temperature, the reaction being carried out in an atmosphere of nitrogen. After stirring for 7 hours the reaction was left standing at room temperature for 3 days under nitrogen. The excess o-ethoxyphenol was removed by distillation and the residue was distilled under reduced pressure to give a white solid boiling in the range 170° – 180° at 0.1mm of mercury pressure. This solid was crystallised from petroleum ether (b.p. 60° – 80°) to give 17.8g of 4-(4-chlorophenylthio)-2-ethoxyphenol, m.p. 80° – 81°.

Analysis:

Found: C, 60.14; H, 4.64%
Required for $C_{14}H_{13}ClO_2S$: C, 59.88; H, 4.66%

The product from the previous stage was reacted with methyl isocyanate by a procedure similar to that described in Example I(B) to afford 4-(4-chlorophenylthio)-2-ethoxyphenyl N-methyl-carbamate, m.p. 88° – 89°.

Analysis:

Found: C, 56.80; N, 4.88; N, 4.32%
Required for $C_{16}H_{16}ClNO_3S$: C, 56.88; H, 4.77; N, 4.15%

EXAMPLE XXVIII

To a solution of 4-(4-chlorophenylthio)-3,5-dimethylphenol (3.9g), prepared by an analogous method to that described in Example I(A) in dry benzene (100ml) was added sodium hydride (2.0g). When the ensuing vigorous effervescence had subsided, N,N-dimethylcarbamoyl chloride (1.73g) was added dropwise with stirring, and the mixture was refluxed for 2 hours. The mixture was then allowed to stand overnight at room temperature, after which water was added to destroy excess sodium hydride. To the separated organic layer was added anhydrous magnesium sulphate, over which it was dried, and after removal of solid by filtration the solution was evaporated in vacuo to afford a solid. This was crystallised from n-hexane to give 1.5g of 4-(4-chlorophenylthio)-3,5-dimethylphenyl N,N-dimethyl-carbamate, m.p. 55° – 57°.

Analysis:

Found: C, 60.79; H, 5.45; N, 4.30%
Required for $C_{17}H_{18}ClNO_2S$: C, 60.90; H, 5.37; N, 4.17%

EXAMPLE XXIX

To a stirred solution of 4-(4-chlorophenylthio)-3,5-dimethylphenol (53g, prepared by the method of Example I(A)) in glacial acetic acid (300ml) was added a 30% aqueous solution of hydrogen peroxide (23ml) in a slow stream. Stirring was continued at room temperature for 48 hours, after which time a white precipitate had formed. The precipitate was collected by filtration and combined with the solid residue from evaporation of the mother liquor in vacuo for use in the next stage, being 4-(4-chlorobenzenesulphinyl)-3,5-dimethylphenol, m.p. 142° – 143°, yield 55g.

To a cooled solution of the product of the previous stage (24g) in dry tetrahydrofuran (400ml), from which insoluble material had been removed by filtration, was added methyl isocyanate (10g), followed by 4 drops of triethylamine. The initially cloudy solution was stirred at room temperature for one hour, during which time it clarified, and then for a further overnight period. By this time a white precipitate had formed. Stirring at room temperature was continued for a further 24 hours, and then the mixture was evaporated in vacuo to afford a white solid. To the latter was added dry benzene (400ml), and the mixture was heated to reflux temperature and allowed to cool again to room temperature. The resulting precipitate (24g) was collected by filtration and crystallised from benzene. Three crystalline crops were collected by filtration, giving a total yield of 18.4g of 4-(4-chlorobenzenesulphinyl)-3,5-dimethylphenyl N-methyl-carbamate, m.p. 190° – 192°.

Analysis:

Found: C, 56.64; H, 4.89; N, 4.25%
Required for $C_{16}H_{16}ClNO_3S$: C, 56.88; H, 4.78; N, 4.12%

EXAMPLE XXX

To a stirred mixture of 4-(4-chlorophenylthio)-2-ethoxyphenol (2.8g; prepared by the method of the first stage of Example XXVII) and glacial acetic acid (15ml) was added a 30% aqueous solution of hydrogen peroxide (1.1ml) in a slow stream. Stirring at room temperature was continued for 48 hours, after the first two hours of which the phenol had completely dissolved in the liquid medium. The reaction solution was then poured into water, and the upper aqueous layer was decanted, leaving an oily lower layer. The latter was dissolved in chloroform and the organic solution was washed in turn with aqueous sodium bicarbonate solution and water, and then evaporated in vacuo to dryness, affording 3.2g of an oil.

After standing over a period of 3 days, the oil had solidified. Crystallisation of the solid from a mixture of benzene and petroleum ether (60°–80°) afforded 2.1g of 4-(4-chlorophenyl sulphinyl)-2-ethoxyphenol, m.p. 98°–99°.
Analysis:

Found: C, 56.64; H, 4.35%
Required for $C_{14}H_{13}ClO_3S$: C, 56.65; H, 4.41%

The product of the previous stage was reacted with methyl isocyanate by a procedure similar to that described in Example I (B) to afford 4-(4-chlorophenylsulphinyl)-2-ethoxyphenyl N-methylcarbamate, m.p. 131°–132°.
Analysis:

Found: C, 54.23; H, 4.82; N, 4.15%
Required for $C_{16}H_{16}ClNO_4S$: C, 54.31; H, 4.56; N, 3.96%

EXAMPLE XXXI

By a procedure similar to that described in the previous Example, using 4-(4-methylphenylthio)-3,5-dimethylphenol as a starting material in the first stage and methyl isocyanate as a reagent in the second, 3,5-dimethyl-4-(4-methylphenylsulphinyl)phenyl N-methylcarbamate, m.p. 146° – 7.5°, was prepared.
Analysis:

Found: C, 64.94; H, 6.31; N, 4.66%
Required for $C_{17}H_{19}NO_3S$: C, 64.33; H, 6.03; N, 4.41%

EXAMPLE XXXII

To a stirred solution of 4-(4-chlorophenylthio)-3,5-dimethylphenol (53g, prepared by the method of Example XX (A)) in glacial acetic acid (450ml) was added a 30% aqueous solution of hydrogen peroxide (200ml) dropwise over a period of 15 minutes. Stirring was continued for 48 hours, during which time a white precipitate formed. The product was collected by filtration and consisted of 48g of 4-(4-chlorobenzenesulphonyl)-3,5-dimethylphenol, m.p. 185°.

To a cooled solution of the product of the previous stage (28g) in dry tetrahydrofuran (400ml) was added methyl isocyanate followed by 5 drops of triethylamine, and the mixture was stirred at room temperature overnight. The mixture was then evaporated in vacuo to a white solid, which was then crystallised from benzene to afford 28g of 4-(4-chlorobenzenesulphonyl)-3,5-dimethylphenyl N-methyl-carbamate, m.p. 169° – 170°.
Analysis:

Found: C, 54.47; H, 4.69; N, 4.04%
Required for $C_{16}H_{16}ClNO_4S$: C, 54.31; H, 4.56; N, 3.96%

EXAMPLE XXXIII

To a stirred mixture of 4-(4-chlorophenylthio)-2-ethoxyphenol (2.8g; prepared by the method of the first stage of Example XXVII) and glacial acetic acid (22.5ml) was added a 30% aqueous solution of hydrogen peroxide (11.3ml) in a slow stream, at the end of which addition the phenol was completely in solution. Stirring at room temperature was continued for 48 hours, after which the reaction solution was poured into water. The resulting upper aqueous layer was decanted, leaving an oily lower layer, which was subsequently dissolved in chloroform. Evaporation of the organic solution in vacuo to dryness, which produced the oil once again, was followed by washing the oil with aqueous sodium bicarbonate solution. The oil solidified on standing over three days, and the solid was crystallised from a mixture of benzene and petroleum ether (60°–80°) to afford 2.3g of 4-(4-chlorophenylsulphonyl)-2-ethoxyphenol, m.p. 106°–107°.
Analysis:

Found: C, 54.06; H, 4.46%
Required for $C_{14}H_{13}ClO_4S$: C, 53.76; H, 4.19%

The product of the previous stage was reacted with methyl isocyanate by a procedure similar to that described in Example I (B) to afford 4-(4-chlorophenylsulphonyl)-2-ethoxyphenyl N-methylcarbamate, m.p. 137°–138°.
Analysis:

Found: C, 51.95; H, 4.52; N, 4.03%
Required for $C_{16}H_{16}ClNO_5S$: C, 51.96; H, 4.36; N, 3.78%

EXAMPLE XXXIV

A mixture of the product of Example XX (B) (2.0g), acetic anhydride (20ml) and concentrated sulphuric acid (specific gravity 1.84, 0.05g) was refluxed for 20 minutes, after which an excess quantity of sodium acetate (1.0g) was added to neutralise the acidic solution. To the cooled solution was added diethyl ether, and the solid material was removed by filtration. The filtrate was then evaporated in vacuo to dryness to afford 2.0g of solid, which was subsequently crystallised from benzene to yield 1.5g of 4-(4-chlorophenylthio)-3,5-dimethylphenyl N-acetyl-N-methyl-carbamate, m.p. 119.5° – 120°.
Analysis:

Found: C, 59.75; H, 5.14; N, 4.08%
Required for $C_{18}H_{18}ClNO_3S$: C, 59.41; H, 4.98; N, 3.85%

EXAMPLES XXXV TO XLV

The following compounds were prepared by procedures similar to that described in Example XXXIV, using the appropriate substituted 4-phenylthiophenyl N-methyl-carbamate and carboxylic acid anhydride starting materials.

In one test, 2 – 4 day old females of the World Health Organisation standard fully susceptible strain *Musca domestica* (common housefly) are anaesthetised with carbon dioxide and then each contacted on the dorsal

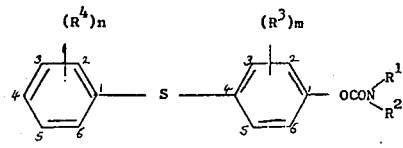

| Example | Ex. No. of Carbamate Starting Material | (R⁴)n | (R³)m | R¹ | R² | M.P. °C | Analysis (Theoretical in brackets) | | |
|---|---|---|---|---|---|---|---|---|---|
| | | | | | | | C% | H% | N% |
| XXXV | I | 4—Br | 3,5—di—CH₃ | —CH₃ | —COCH₃ | 124.5–5.5° | 52.99 (52.94 | 4.43 4.44 | 3.46 3.43 |
| XXXVI | VI | 4—Br | 3,6—di—CH₃ | —CH₃ | —COCH₃ | 99–100° | 53.20 (52.94 | 4.47 4.44 | 3.56 3.43) |
| XXXVII | II | 4—Cl | 3,5—di—CH₃ | —C₂H₅ | —COCH₃ | 83–4° | 60.46 (60.40 | 5.44 5.30 | 3.41 3.71. |
| XXXVIII | III | 4—Cl | 2,3,5—tri—CH₃ | —CH₃ | —COCH₃ | 91–2° | 60.12 (60.40 | 5.40 5.30 | 3.34 3.71 |
| XXXIX | XXI | H | 3,5—di—CH₃ | —CH₃ | —COCH₃ | 87– 8° | 65.60 (65.60 | 5.86 5.78 | 4.51 4.26) |
| XL | IV | 4—Cl | H | —CH₃ | —COCH₃ | 59–60° | 57.23 (57.22 | 4.21 4.20 | 4.29 4.20) |
| XLI | XI | 3,4—di—Cl | 3,5—di—CH₃ | —CH₃ | —COCH₃ | 99–100° | 54.34 (54.27 | 4.33 4.30 | 3.85 3.52) |
| XLII | XX | 4—Cl | 3,5—di—CH₃ | —CH₃ | —COC₂H₅ | 66–8° | 60.45 (60.41 | 5.33 5.34 | 4.10 3.71) |
| XLIII | XX | 4—Cl | 3,5—di—CH₃ | —CH₃ | —COnC₃H₇ | 59.5–60.5° | 61.73 (61.29 | 5.66 5.66 | 3.30 3.57) |
| XLIV | XX | 4—Cl | 3,5—di—CH₃ | —Ch₃ | COisoC₃H₇ | 74–6° | 61.64 (61.29 | 5.76 5.66 | 3.55 3.57) |
| XLV | XVIII | H | 3,5—di—C₂H₅ | —Ch₃ | —COCH₃ | 52–3° | 67.00 (67.21 | 6.29 6.49 | 4.04 3.92) |
| XLVI | XIX | 4—Cl | 3,5—di—C₂H₅ | —CH₃ | —COCH₃ | 94–5° | 61.01 (61.30 | 5.57 5.66 | 3.76 3.57) |

EXAMPLE XLVII

A solution of 4-(4-chlorophenylthio)-3,5-dimethylphenyl N-methyl-carbamate (2.0g, prepared by the method of Example XX) and chloroacetyl chloride (0.77g) in dry xylene (75ml) were refluxed with stirring for 48 hours. The solvent was removed by evaporation in vacuo, and the solid residue was crystallised from a mixture of benzene and petroleum ether, affording two crops of crystals, 0.6g and 0.8g, both found to be identical from thin layer chromatographic evidence. Produced was 4-(4-chlorophenylthio)-3,5-dimethylphenyl N-chloroacetyl-N-methyl-carbamate, m.p. (first crop) 107–108°.
Analysis:

Found (first crop): C, 54.23; H, 4.29; N, 3.45%
Required for C₁₈H₁₇Cl₂NO₃S: C, 54.27; H, 4.30; N, 3.51%

EXAMPLE XLVIII

By a procedure similar to that described in the previous Example, using 3,5-dimethyl-4-phenylthiophenyl N-methyl-carbamate (one of the two products of Example XXI) and chloroacetyl chloride as starting materials, 3,5-dimethyl-4-phenylthiophenyl N-chloroacetylN-methyl-carbamate, m.p. 104°–105°, was prepared.
Analysis:

Found: C, 59.08; H, 5.06; N, 3.60%
Required for C₁₈H₁₈ClNO₃S: C, 59.40; H, 4.95; N, 3.85%

The compounds of the invention have been found to be potent pesticidal agents. This has been shown in tests in which their insecticidal and acaricidal properties towards houseflies, blowflies and ticks of various stages of maturity have been measured.

surface of the thorax with one microgram of the test compound contained in 1 microlitre of solution, using e.g. acetone, methanol or methyl ethyl ketone as the solvent. The flies are then maintained for 24 hours in gauze-covered pots at 25°C and at about 50% relative humidity with a cotton wool pad moistened with sugar solution as a source of food placed on the gauze. Contacted with an equivalent volume of solvent only are the same number of anaesthetised control flies. At the end of the 24 hours period the mortality is noted and recorded as a percentage, after correction for any mortality amongst the controls. The result gives a measure of the effectiveness of the test compound applied topically.

In order to test the effectiveness of the compounds when used as bait for adult blowflies, two groups of adult female *Lucilia sericata* are maintained for 24 hours in pots each containing sugar and a pad of wet cotton wool as a free water supply, one of the sugar supplies being impregnated with test compound to the extent of 100 p.p.m. The mortality is noted as in the previous test and recorded as a corrected percentage.

Larvicidal properties are investigated by maintaining test and control groups of *Lucilia sericata* (blowfly) larvae in separate test-tubes, each containing filter paper partially soaked in calf serum serving as food and plugged with cotton wool. The filter paper in the test-tube containing the test larvae is additionally impregnated with the compound under investigation to the extent of a 100mg/$_m$2 deposition. Both test-tubes are stored with the top part only in a strong light so as to induce the larvae to stay in the lower part of the tubes in contact with the filter paper through exploitation of their aversion to light. As in previous tests, mortality is noted and recorded as a corrected percentage. The finding of substantial numbers of test larvae on the illuminated plug suggests that the test compound has marked repellant properties.

Effectiveness against tick nymphs is measured using a similar procedure to the previous test described, the principal differences being that the filter papers used are not impregnated with any food material, all the ticks are unfed, and the containing vessels used are glass jars. A result in the form of a corrected percentage figure is again obtained for each compound.

In addition to percentage effectiveness figures, $ED_{50}$ results can be obtained from dose response measurements using any of the aforedescribed tests.

As a result of its performance in the tests, a preferred class of compounds comprises those compounds having the general formula (I) in which the group

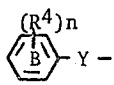

is in the 4-position on the ring A relative to the group $-OCXNR^1R^2$. Amongst these compounds have been found particularly effective compounds of the formula (I) in which any of the features: (1) ring A is a benzene ring; (2) $R^1$ is a methyl group; (3) $(R^3)m$ is 3-alkyl, 3,5- or 3,6-dialkyl, 2,3,5-trialkyl, 2-alkoxy (or -alkylthio), 2,6-dialkoxy (or -dialkylthio) on a benzene ring; (4) $(R^4)n$ is hydrogen, 4-halo, 4-alkyl, 4-methoxy, 4-nitro or 3,4-dichloro; and (5) $R^2$ is hydrogen, lower alkanoyl or halo-substituted lower alkanoyl, is present.

Especially preferred individual compounds include 4-(4-bromophenylthio)-3,5-dimethylphenyl N-methyl-carbamate and the corresponding 4-chloro-compound, 3,5-dimethyl-4-phenylthiophenyl N-methylcarbamate, 4-(4-chlorophenylthio)-3,5-dimethylphenyl N-acetyl-N-methylcarbamate and the corresponding 4-bromo-compound, 3,5-dimethyl-4-phenylthiophenyl N-acetyl-N-methyl-carbamate and 4-(4-chlorophenylthio)-3,5-dimethylphenyl N-methyl-N-propionyl-carbamate and the corresponding N-(n-butyryl)- and N-isobutyryl-compounds.

The compounds of the invention when used for treating ectoparasitic infections of animals such as sheep and cattle are suitably administered in the form of dips or sprays comprising an aqueous emulsion of an emulsifiable concentrate, or as dusts or wettable powders. The emulsifiable concentrate may be, for example, a 5–40% (g/100 ml) solution of the compound in a non-toxic organic solvent containing an emulsifying agent, and this may be diluted with water to give a concentration of the compound in the aqueous medium of from 50 to 1,000 ppm. The concentration of active ingredient in the wettable powder can range from about 25% to about 75% w/v.

The compositions of the invention may comprise a diluent or carrier, liquid or solid, in the form of sprays, including emulsions, slurries and solutions, or as dusts. The concentration of active ingredient in the dust can range from about 0.1% to about 10% w/v.

For convenience and economy of application the compositions of the invention may consist of the active ingredient formulated into a dust, wettable powder or emulsifiable concentrate. A dust may be made by mixing the proper amount of active ingredient with a diluent or carrier such as talc, clay, calcite, pyrophyllite, diatomaceous earth, walnut shell flour, silica gel, hydrated alumina or calcium silicate to afford a concentration of active ingredient of from about 0.25% to about 4% by weight. A dust can also be prepared by mixing the diluent or carrier with a solution of the active ingredient in a volatile organic solvent such as benzene or acetone. The solvent is then removed by evaporation and the mixture ground.

Wettable powders, of special value for spray applications, may be made by adding suitable wetting agents and conditioning agents to the dusts.

Emulsifiable concentrates may be made by dissolving the active ingredient and an emulsifying agent in a substantially water-immiscible organic solvent. Suitable solvents are toluene, xylene and petroleum oil or an alkylated naphthalene. The volatile solvents, e.g. toluene, xylene, evaporate after spraying to leave a deposit of the active ingredient. The emulsifying agent can be cationic, anionic, or non-ionic as is well-known to those skilled in the art. As suitable emulsifiers there may be mentioned ordinary soaps (anionic), lauryl pyridinium chloride (cationic) and polyoxyethylene lauryl ethers (non-ionic), the latter being for example a reaction product of ethylene oxide (ten moles) with dodecylalcohol (one mole). Such concentrates may suitably contain from 5 to 40% of the active ingredient and may be mixed with a sufficient volume of water to provide a concentration of active ingredient of from 50 to 1000 ppm.

For the compositions of the invention, a wide choice of diluents, emulsifiers, wetting agents or solvents, is available. The particular diluent, emulsifier, solvent or wetting agent best suited for a given formulation may readily be determined by those skilled in the art by simple experiment. A suitable composition for an emulsifiable concentrate containing a compound of the invention is illustrated by the following example.

EXAMPLE XLIX

The constituents of a prepared emulsifiable concentrate were as follows:

| | |
|---|---|
| 4-(4-chlorophenylthio)-3,5-dimethylphenyl N-methyl-carbamate (compound of Example XX) | 5.0% w/v |
| Arylan CA - calcium dodecyl benzene sulphonate in an alcoholic solvent. | 3.5% w/v |
| Ethylan BV - alkyl phenol polyglycol ether. | 1.5% w/v |
| Aromasol H - mixed HC solvent. | to 100% |
| (Arylan, Ethylan and Aromasol are trade marks.) | |

The emulsifying agents Arylan CA and Ethylan BV, and the solvent Aromasol H were admixed and stirred until homogeneous, and the compound of the invention was then added. Stirring was continued until the compound had completely dissolved in the medium.

The concentrate is suitably diluted with water, thus affording an aqueous emulsion, before administration as a dip or spray to infected animals.

What is claimed is:

1. A compound selected from the group consisting of 4-(4-bromophenylthio)-3,5-dimethylphenyl N-methyl-carbamate, 4-(4-chlorophenylthio)-3,5-dimethylphenyl N-methyl-carbamate, 3,5-dimethyl-4-phenylthiophenyl N-methyl-carbamate, 4-(4-chlorophenylthio)-3,5-dimethylphenyl N-acetyl-N-methyl-carbamate, 4-(4-bromophenylthio)-3,5-dimethylphenyl N-acetyl-N-methylcarbamate, 3,5-dimethyl-4-phenylthiophenyl N-acetyl-N-methylcarbamate, 4-(4-chlorophenylthio)-3,5-dimethylphenyl N-methyl-N-propionyl-carbamate, 4-(4-chlorophenylthio)-3,5-dimethylphenyl N-methyl-N-(n-butyryl)-carbamate and 4-(4-chhlorophenylthio)-3,5-dimethylphenyl N-methyl-N-isobutyryl-carbamate.

2. The compound of claim 1 which is 4-(4-bromophenylthio)-3,5-dimethylphenyl N-methyl-carbamate.

3. The compound of claim 1 which is 4-(4-chlorophenylthio)-3,5-dimethylphenyl N-methyl-carbamate.

4. The compound of claim 1 which is 3,5-dimethyl-4-phenylthiophenyl N-methyl-carbamate.

5. The compound of claim 1 which is 4-(4-chlorophenylthio)-3,5-dimethylphenyl N-acetyl-N-methyl-carbamate.

6. The compound of claim 1 which is 4-(4-bromophenylthio)-3,5-dimethylphenyl N-acetyl-N-methyl-carbamate.

7. The compound of claim 1 which is 3,5-dimethyl-4-phenylthiophenyl N-acetyl-N-methyl-carbamate.

8. The compound of claim 1 which is 4-(4-chlorophenylthio)-3,5-dimethylphenyl N-methyl-N-propionyl-carbamate.

9. The compound of claim 1 which is 4-(4-chlorophenylthio)-3,5-dimethylphenyl N-methyl-N-(n-butyryl)-carbamate.

10. The compound of claim 1 which is 4-(4-chlorophenylthio)-3,5-dimethylphenyl N-methyl-N-isobutyryl-carbamate.

* * * * *